(12) United States Patent
Arimitsu et al.

(10) Patent No.: US 7,388,309 B2
(45) Date of Patent: Jun. 17, 2008

(54) MAGNETIC CIRCUIT STRUCTURE FOR ROTARY ELECTRIC MACHINE

(75) Inventors: Minoru Arimitsu, Kanagawa (JP); Kan Akatsu, Tokyo (JP)

(73) Assignee: Nissna Motor Co., Ltd., Yokohama-shi (JP)

( * ) Notice: Subject to any disclaimer, the term of this patent is extended or adjusted under 35 U.S.C. 154(b) by 181 days.

(21) Appl. No.: 11/226,922

(22) Filed: Sep. 15, 2005

(65) Prior Publication Data
US 2006/0055268 A1 Mar. 16, 2006

(30) Foreign Application Priority Data
Sep. 15, 2004 (JP) .............................. 2004-268288

(51) Int. Cl.
*H02K 1/27* (2006.01)
(52) U.S. Cl. .............................. 310/156.45; 310/156.55
(58) Field of Classification Search ........... 310/156.43, 310/156.53–156.56, 268, 156.45
See application file for complete search history.

(56) References Cited

U.S. PATENT DOCUMENTS

| 5,631,512 | A | | 5/1997 | Kawabata et al. |
| 6,031,311 | A | * | 2/2000 | Lee ........................ 310/156.57 |
| 6,322,060 | B1 | * | 11/2001 | Mayama et al. ............ 267/136 |
| 6,927,519 | B2 | * | 8/2005 | Popov ................... 310/156.56 |
| 7,183,675 | B2 | * | 2/2007 | Huang et al. ............. 310/49 R |
| 7,196,446 | B2 | * | 3/2007 | Hans ..................... 310/156.53 |
| 2003/0234585 | A1 | * | 12/2003 | Tu et al. ...................... 310/12 |

FOREIGN PATENT DOCUMENTS

JP 07-336919 A 12/1995

* cited by examiner

*Primary Examiner*—Tran Nguyen
(74) *Attorney, Agent, or Firm*—Foley & Lardner LLP

(57) ABSTRACT

A rotary electric machine includes a rotor including a plurality of magnet sections arranged along a rotational direction of the rotor so that polarities of the magnet sections change alternately, and a stator including armature coils, and being disposed to confront the rotor across an air gap. Permanent magnet flux which is not linked with one of the air gap and the armature coils is higher than permanent magnet flux which is linked with the air gap and the armature coils in a no-load state.

4 Claims, 5 Drawing Sheets

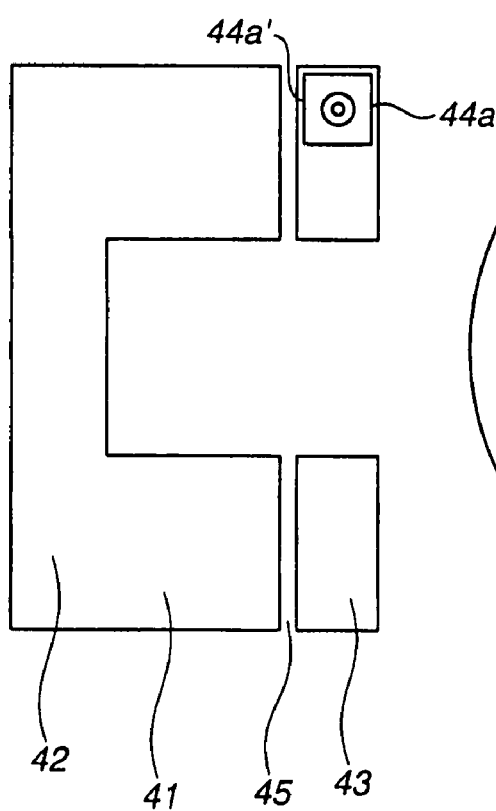 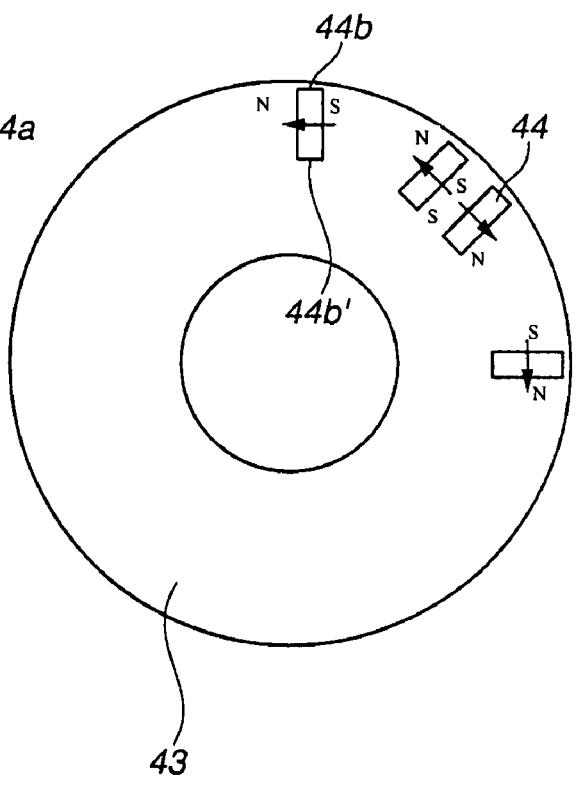

MAGNETIC CIRCUIT STRUCTURE FOR ROTARY ELECTRIC MACHINE

BACKGROUND OF THE INVENTION

The present invention relates to a magnetic circuit structure for a rotary electric machine, and more especially to a magnetic circuit structure for a rotary electric machine such as a permanent magnet motor.

U.S. Pat. No. 5,631,512 (corresponding to Japanese patent application publication No. H 07 (1995)-336919) shows a permanent magnet motor including a rotor, and a plurality of permanent magnets arranged circumferentially at regular intervals identical to a circumferential length of the permanent magnets. This permanent magnet motor further includes a salient pole made of soft magnetic material, located between adjacent two of the permanent magnets, and arranged to have a thickness identical to a thickness of the permanent magnets.

SUMMARY OF THE INVENTION

The permanent magnet motor mentioned above has IPM (Interior Permanent Magnet) structure of inverse saliency, and hence magnetic flux is always linked with stationary magnetic material (stator teeth). Therefore, it is not possible to prevent from generating motor iron loss and cogging torque in a no-load state.

In a conventional permanent magnet motor, even when armature coils are not supplied with electric current (torque=0), the magnetic flux generated from the permanent magnets is linked with the stationary magnetic material. Accordingly, even in the no-load state, the iron loss is generate in the permanent magnet motor, motor temperature is increased, and thereby operating points can not be widened. Moreover, a permanent magnet motor to achieve the high torque is configured to increase the magnetic flux (permanent magnet flux), and therefore generates the high cogging torque and vibration.

When the electric current is not supplied for malfunction of a controller or an inverter at high speed, induced voltage is generated by rotation. Therefore, power devices or other electrical components of the inverter may be destroyed. In the permanent magnet motor of the inverse saliency, the magnetic field is generally weakened to increase the torque, and this magnetic field becomes reverse magnetic field against the permanent magnets. Consequently, the NeFeBr magnets may be permanently demagnetized.

It is an object of the present invention to provide a rotary magnetic machine arranged to achieve reduction in motor iron loss and cogging torque at a no-load state.

According to one aspect of the present invention, a rotary electric machine comprises a rotor including a plurality of magnet sections arranged along a rotational direction of the rotor so that polarities of the magnet sections change alternately; and a stator including armature coils, and being disposed to confront the rotor across an air gap. Permanent magnet flux which is not linked with one of the air gap and the armature coils is higher than permanent magnet flux which is linked with the air gap and the armature coils in a no-load state.

According to another aspect of the invention, a rotary electric machine comprises a rotor including a plurality of permanent magnets arranged along a rotational direction of the rotor so that the polarities of the permanent magnets change alternately; and a stator including armature coils, and being disposed to confront the rotor across an air gap; and means for causing permanent magnet flux which is not linked with one of the air gap and the armature coils to be higher than permanent magnet flux which is linked with the air gap and the armature coils in a no-load state.

BRIEF DESCRIPTION OF THE DRAWINGS

FIG. 8A is a sectional view showing an axial gap permanent magnet motor according to a forth embodiment of the present invention. FIG. 8B is a plan view showing a rotor of the axial gap permanent magnet motor of FIG. 8A.

DETAILED DESCRIPTION OF THE INVENTION

Figure 1:
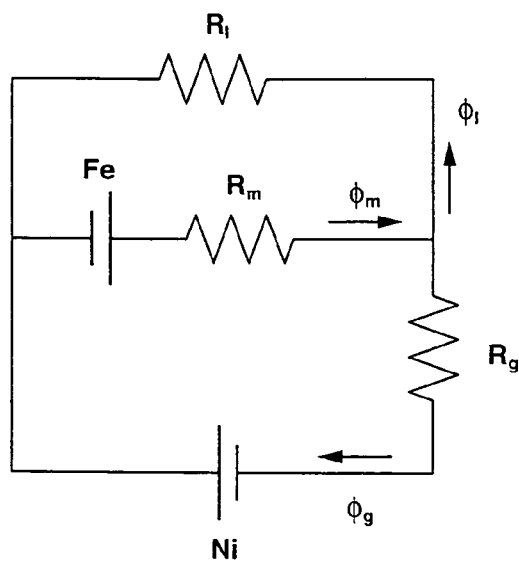
FIG. 1 is an equivalent circuit showing a magnetic circuit structure for a rotary electric machine according to embodiments of the present invention.

FIG. 1 shows an equivalent circuit of a magnetic circuit structure for a rotary electric machine according to embodiments of the present invention. In the equivalent circuit of FIG. 1, the following equations (1) through (4) are satisfied:

$$\phi_m = \phi_l + \phi_g \quad (1)$$

$$\phi_r = B_r \cdot a_m \quad (2)$$

$$F_e - R_m \cdot \phi_m = R_m(\phi_r - \phi_m) = R_g \cdot \phi_g - N_i \quad (3)$$

$$R_m(\phi_r - \phi_m) = \phi_l \cdot R_l \quad (4)$$

In these equations, $\phi_m$ is a permanent magnet flux, $\phi_l$ is a leakage flux, $\phi_g$ is an air gap magnetic flux, $R_l$ is a magnetic resistance to the leakage flux at an end of a permanent magnet, $N_i$ is a magnet motive force by an armature coil, $\phi_r$ is a magnetic flux in a state in which there is no magntic field in the permanent magnet, $B_r$ is a magnetic remnant flux density of the permanent magnet, $a_m$ is a cross section area of the permanent magnet, $F_e$ is a magnet motive force by the permanent magnet, $R_m$ is a magnetic resistance of the permanent magnet, and $R_g$ is a magnetic resistance of an air gap.

$\phi_g$ and $\phi_l$ are obtained by solving these equations (1) through (4).

$$\Phi_g = \frac{R_m R_l}{R_m R_l + R_l R_g + R_m R_g} \Phi_r + \frac{R_l + R_m}{R_l R_m + R_l R_g + R_m R_g} N_i \quad (5)$$

$$\Phi_l = \frac{R_m}{R_l + R_m}(\Phi_r - \Phi_g) \quad (6)$$

In the equation (5), the first term is determined by magnetic remnant flux density $B_r$ of the permanent magnet, and the second term is determined by the magnet motive force of the armature coil. When there is no current, only the first term remains in the equation (5). When there is the current, air gap magnetic flux $\phi_g$ is increased, and thereby leakage flux $\phi_l$ is decreased from the equation (6). Accordingly, air gap magnetic flux $\phi_g$ can be decreased in the no-load state by making leakage flux $\phi_l$ increased.

As the magnetic field is increased, the magnetic steel sheets used as magnetic material are practically saturated at predetermined intensity of the magnetic field. The magnetic flux does not flow any more. The following equations stand for this characteristic.

$$\left\{ \begin{array}{l} B_t = \frac{\Phi_g}{a_t}(B_t < B_{\max}) \\ B_t = B_{\max}(B_t \geq B_{\max}) \end{array} \right\} \quad (7)$$

From this equation (7), air gap magnetic flux $\phi_g$ is expressed by the equation (8) in a state in which the teeth magnetic steel sheets are not saturated. Accordingly, air gap magnetic flux $\phi_g$ is linearly increased with the armature coil current.

$$\left\{ \begin{array}{ll} \Phi_g = \frac{R_m R_l}{R_m R_l + R_l R_g + R_m R_g} \Phi_r + & \\ \quad \frac{R_l + R_m}{R_l R_m + R_l R_g + R_m R_g} N_i & (B_t < B_{\max}) \\ \Phi_g = B_{\max} a_t & (B_t \geq B_{\max}) \end{array} \right\} \quad (8)$$

Figure 2:
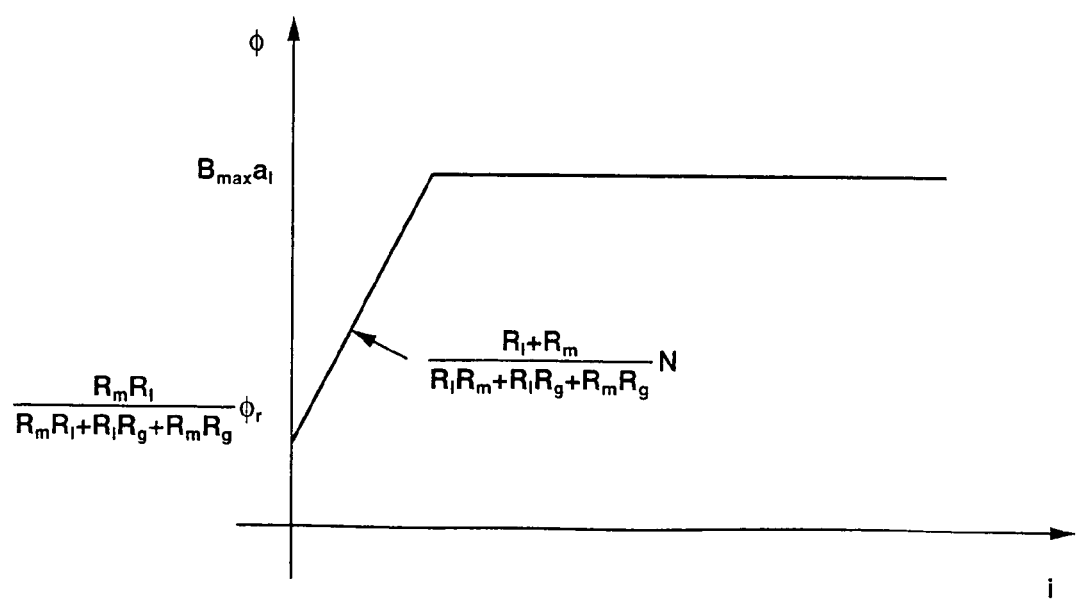
FIG. 2 is a graph showing a relation between an electric current in an armature coil and teeth magnetic flux.

As the armature coil current is increased, air gap magnetic flux $\phi_g$ approaches a constant value by the saturation mentioned above. This air gap magnetic flux $\phi_g$ as teeth magnetic flux is $B_{max}$ at where $B_{max}$ is a saturation magnetic flux density and at is a teeth sectional area. FIG. 2 shows a graph illustrating a relationship between the electric current and the air gap magnetic flux where i is the armature coil current and $\phi$ is the teeth magnetic flux. In general, the magnetic flux density is not a completely constant value as the equation (7), even in the range of the saturation area. The ratio of the magnetic flux density to the magnetic field approaches permeability $\mu_o$ of the vacuum gradually, and thereby the graph shown in FIG. 2 has slope.

Hereinafter, embodiments to achieve the state mentioned above will be described. The magnetic circuit structure according to the present invention is applicable to an axial gap motor provided with disk type rotors or a radial gap motor.

Figure 3:
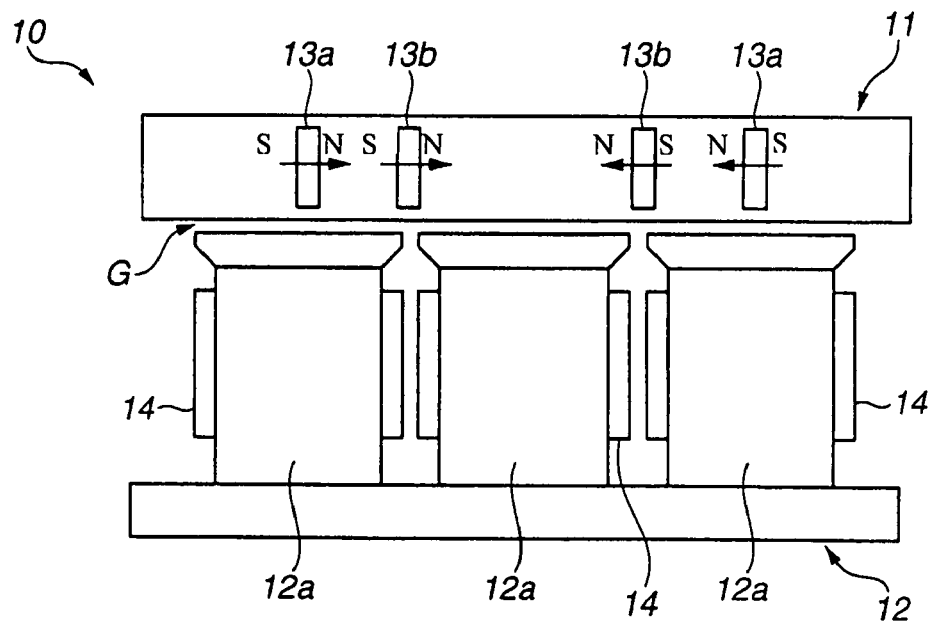
FIG. 3 is a partial sectional view showing a rotor and a stator of a rotary electric machine according to a first embodiment of the present invention.

FIG. 3 shows a partial sectional view of a rotor 11 and a stator 12 for illustrating a magnetic circuit structure for a rotary electric machine 10 according to a first embodiment of the present invention. As shown in FIG. 3, rotary electric machine 10 includes rotor 11, stator 12, and an air gap G between rotor 11 and stator 12. Rotor 11 made of magnetic material includes permanent magnets 13a and 13b embedded in rotor 11, and arranged in a rotating direction of rotor 11. Permanent magnets 13a and 13b have opposite polarities (N pole and S pole) respectively. Stator 12 includes teeth 12a on which armature coils 14 are wounded. Rotary electric machine 10 generates the torque by being supplied with the electric current to armature coils 14 in synchronism with the rotating magnetic field generated by rotation of permanent magnets 13a and 13b provided in rotor 11.

Rotary electric machine 10 includes a plurality of magnet sections each including a pair of permanent magnets 13a, 13a of the same polarity or a pair of permanent magnets 13b, 13b of the same polarity. The magnet sections are arranged in a rotational direction so that the polarities of the magnet sections change alternately. The permanent magnets are so arranged that a length between adjacent two of the permanent magnets of the same polarity (13a, 13a or 13b, 13b) is substantially identical to a width of the stator teeth, and that a length between adjacent two of the permanent magnets of the opposite polarities (13a, 13b or 13a, 13b) is narrower than the width of the stator teeth (that is, the length between adjacent two of the permanent magnets of the same polarity). The number of the permanent magnets forming the same polarity is not limited to two, and may be three or more. Assuming that a plurality of the permanent magnets form one pole, the surface area of the permanent magnets can be increased. Therefore, the main magnetic flux can be increased by the small volume of the permanent magnets.

Figure 4:
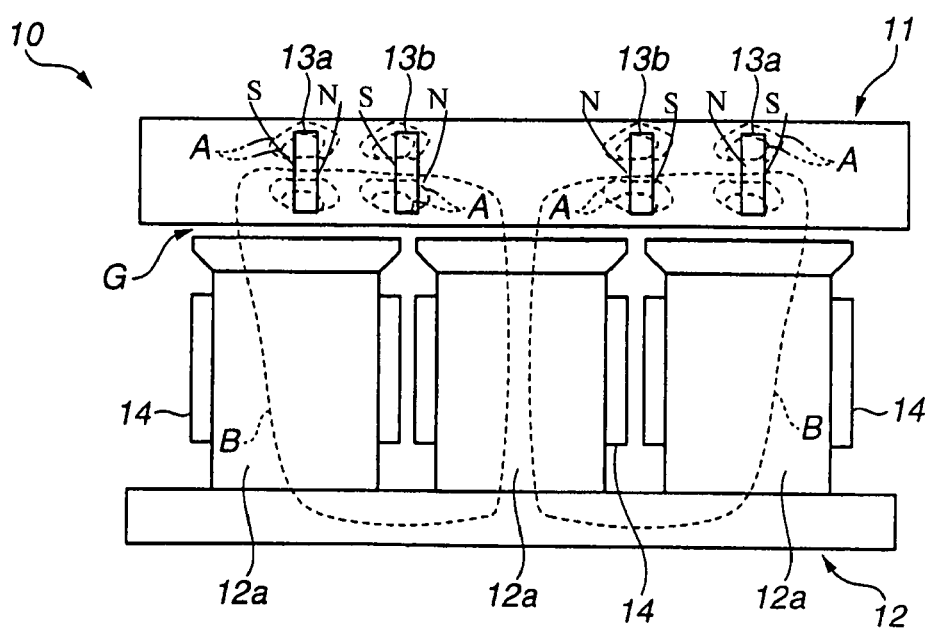
FIG. 4 is a partial sectional view showing the rotor and the stator of the rotary electric machine of FIG. 3 in a state in which armature coils are not supplied with electric current.
Figure 5:
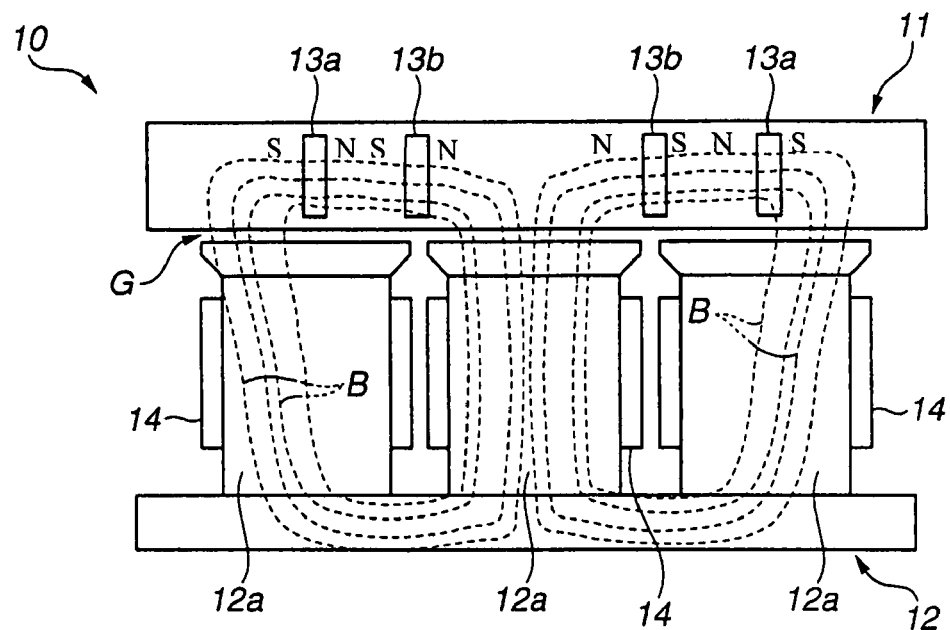
FIG. 5 is a partial sectional view showing the rotor and the stator of the rotary electric machine of FIG. 3 in a state in which the armature coils are supplied with the electric current.

FIG. 4 shows a partial sectional view of rotary electric machine 10 of FIG. 3 illustrating the magnetic flux from the permanent magnets in a state in which the armature coils are not supplied with the electric current. FIG. 5 shows a partial sectional view of rotary electric machine 10 of FIG. 3 illustrating the magnetic flux from the permanent magnets in a state in which the armature coils are supplied with the electric current. In a no-load state in which armature coils 14 are not supplied with the electric current, the magnetic flux from permanent magnets 13a and 13b is not linked mostly with stator 12, and leaks through the magnetic material (rotor 11) at both sides of permanent magnets 13a and 13b. That is, the permanent magnet flux becomes leakage flux A which is not linked with air gap G or armature coils 14 (as shown in FIG. 4). Accordingly, in the no-load state, a small amount of main magnetic flux B flows through armature coils 14, and the cogging torque and the motor iron loss are reduced.

In a load state in which armature coils 14 are supplied with the positive d-axis current (in a magnetizing direction), leakage flux A of permanent magnets 13a and 13b is extremely reduced. The magnetic flux from permanent magnets 13a and 13b is mostly linked with teeth 12a of stator 12, and then passes through armature coils 14. Accordingly, the magnetic flux from permanent magnets 13a and 13b becomes main magnetic flux B linked with air gap G and armature coils 14. As shown in FIG. 5, the d-axis current strengthens the field. In this state, the q-axis current is superposed, and thereby it is possible to generate the torque for rotor 11.

Armature coils 14 are supplied with the electric current so that operating points of permanent magnets 13a and 13b are moved in a direction to increase the permanent magnet flux, and thereby the magnetic flux from the permanent magnets which is not linked with air gap G or armature coils 14 is reduced. For the improvement in the permanent magnet flux in the load state, armature coils 14 are supplied with the electric current in a direction identical to the magnetizing direction of the permanent magnet. Thereby, the magnetic flux of the main magnetic circuit can be increased, and it is possible to prevent the permanent demagnetization in accordance with the temperature increase.

Figure 6:
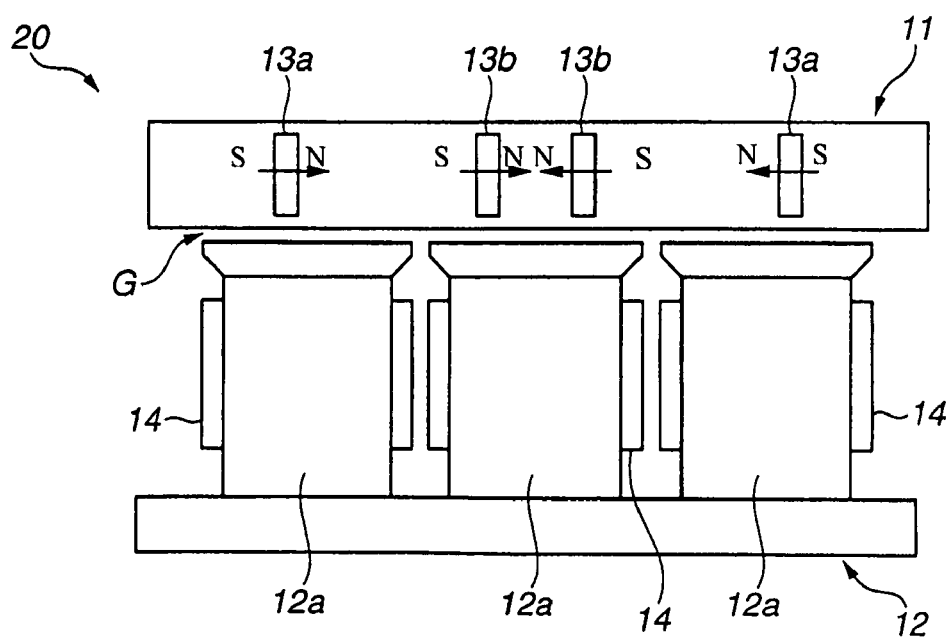
FIG. 6 is a partial sectional view showing a rotor and a stator of a rotary electric machine according to a second embodiment of the present invention.

FIG. 6 shows a partial sectional view of a rotor 11 and a stator 12 for illustrating a magnetic circuit structure for a rotary electric machine 20 according to a second embodiment of the present invention. As shown in FIG. 6, rotary electric machine 20 is so arranged that a length between two of the permanent magnets (13a, 13a or 13b, 13b) of the same polarity is shorter than the width of teeth 12a. In the other respects, rotary electric machine 20 is substantially identical to rotary electric machine 10 (as shown in FIG. 3) in structure and operation.

In the layout of rotor 11 of rotary electric machine 10, the permanent magnets are so arranged that a length between two of the permanent magnets (13a, 13a or 13b, 13b) of the same polarity forming N-pole or S-pole is substantially equal to the width of the stator teeth. Accordingly, the d-axis inductance is lower than the q-axis inductance, and rotary electric machine 10 has the inverse saliency. Therefore, the q-axis current is superposed in a state in which the d-axis current is supplied, so that the torque is decreased.

The motor torque is the sum of the magnet torque and the reluctance torque. Reluctance torque T is shown as $T=(L_d-L_q) i_d \times i_q$ where $Ld_d$ is a d-axis inductance, $L_q$ is a q-axis inductances $i_d$ is a d-axis armature current, and $i_q$ is a q-axis armature current. In the layout of rotor 11 of rotary electric machine 10 according to the first embodiment (as shown in FIG. 3), d-axis reluctance $R_d$ is higher than q-axis reluctance $R_g$ ($R_d < R_q$) Therefore, d-axis inductance $L_d$ is lower than q-axis inductance $L_q$ ($L_d > L_q$). and reluctance torque T act in a negative direction.

In the layout of rotor 11 of the rotary electric machine 20 shown in FIG. 6, the permanent magnets are so arranged that a length between two of the permanent magnets of the same polarity forming the N pole or the S pole (13a, 13a or 13b, 13b) is shorter than the width of teeth 12a of stator 12. That is, permanent magnets 13a and 13b are so arranged that a length between permanent magnets 13a and 13b of the opposite polarities is longer than the length between permanent magnets 13a or 13b of the same polarity. Therefore, d-axis inductance $L_d$ is higher than q-axis inductance $L_q$, so that the rotary electric machine has the saliency.

Because q-axis reluctance $R_q$ is increased, d-axis reluctance $R_d$ is lower than q-axis reluctance $R_q$ ($R_d < R_q$). Therefore, d-axis inductance $L_d$ is higher than q-axis inductance $L_q$ ($L_d > L_q$), and reluctance torque T act in a positive direction. Accordingly, the q-axis current is superposed in a state in which the positive d-axis current is supplied, and it is possible to use reluctance torque T of the d-axis current. Therefore, the rotary electric machine improves the efficiency without decreasing the torque.

In the example according to the second embodiment, the direct axis inductance of armature coils 14 is higher than the quadrature axis inductance of armature coils 14, and thereby d-axis inductance $L_d$ can be higher than q-axis inductance $L_q$ ($L_d > L_q$). Therefore, it is possible to use the reluctance torque in accordance with the field strengthening. Permanent magnets 13a and 13b so are arranged that the length between adjacent two of permanent magnets 13a and 13b of the opposite polarities is greater than the length between adjacent two of permanent magnets 13a or 13b of the same polarity (as shown in FIG. 6), and thereby the direct inductance of armature coils 14 can be readily higher than the quadrature inductance of armature coils 14.

Figure 7:
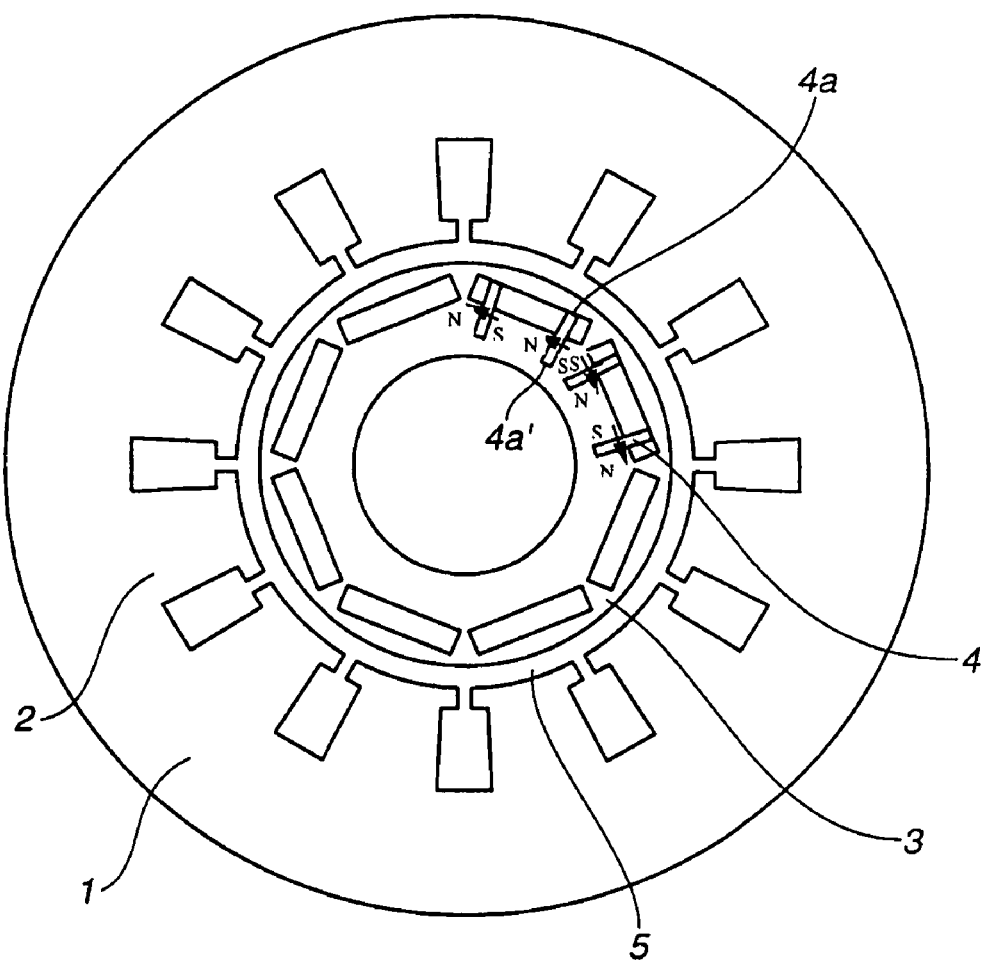
FIG. 7 is a sectional view showing a rotary electric machine according to a third embodiment of the present invention.

FIG. 7 shows, in section, a rotary electric machine according to a third embodiment of the present invention. This rotary electric machine is a three-phase, eight-pole rotary electric machine including a stator 1, a rotor 3 confronting stator 1 radially across an air gap 5, and permanent magnets 4. Armature coils (not shown) are wounded on stator teeth 2. Permanent magnets 4 shown in FIG. 7 are one pole pairs. Other permanent magnets are arranged to repeat this arrangement. Rotor 3 includes a plurality of magnet sections each including a pair of permanent magnets 4 of the same polarity. Each of permanent magnets 4 is so disposed as not to be perpendicular to air gap 5, and as to be inclined with respect to a line perpendicular to the air gap, at a predetermined angle. Thereby, as compared with the arrangement in which each of permanent magnets 4 is disposed to be perpendicular to air gap 5, the sectional area of the permanent magnets can be greater, and the magnetic flux from the permanent magnets can be increased. In a state in which the armature coils are not supplied with the electric current, the magnetic flux of the permanent magnets leaks at both ends 4a and 4a' of the permanent magnets, and thereby the magnetic flux passing through the stator is lower than the magnetic flux passing through the stator in a state in which the armature coils are supplied with the electric current. Therefore, it is possible to decrease the induced voltage and the corresponding cogging torque in the no-load state.

In the example of FIG. 7, the permanent magnets are so arranged that the length between adjacent two of the permanent magnets of the opposite polarities is longer than the length between adjacent two of the permanent magnets of the same polarity. Therefore, the rotary electric machine has the saliency, and can reduce the magnetic flux leakage. Moreover, the phase of the electric current to guide the magnetic flux to the stator can correspond to the phase of the electric current to generate the torque, and it is possible to generate the larger torque as the magnetic flux from the permanent magnets passes through the stator.

FIG. 8A shows, in section, an axial gap permanent magnet motor according to a forth embodiment of the present invention. FIG. 8B shows a plan view of a rotor of the axial gap permanent magnet motor of FIG. 8A. This axial gap permanent magnet motor is a three-phase, eight-pole rotary electric machine including a stator 41, a rotor 43 confronting stator 41 axially across an air gap 45, and permanent magnets 44. Rotor 43 includes a plurality of magnet sections each including a pair of permanent magnets 44 of the same polarity. Twelve stator teeth are arranged at regular intervals so as to be perpendicular to a stator yoke 42. The permanent magnets so are arranged that a circumferential length between adjacent two of the permanent magnets of the opposite polarities is longer than a circumferential length between adjacent two of the permanent magnets of the same polarity. In a state in which the armature coils are not supplied with the electric current, the magnetic flux from the permanent magnets leaks at ends 44a, 44a' and 44b, 44b' of the permanent magnet, and thereby the magnetic flux passing through the stator can be smaller than the magnetic flux passing through the stator in the electric current supply state. Therefore, it is possible to decrease the induced voltage and the corresponding cogging torque in the no-load state.

This application is based on a prior Japanese Patent Application No. 2004-268288. The entire contents of the Japanese Patent Application No. 2004-268288 with a filing date of Sep. 15, 2004 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A rotary electric machine comprising:
   a rotor including a plurality of magnet sections arranged along a rotational direction of the rotor so that polarities of the magnet sections change alternately; and a stator including armature coils, and being disposed to confront the rotor across an air gap;

permanent magnet flux which is not linked with one of the air gap and the armature coils being higher than permanent magnet flux which is linked with the air gap and the armature coils in a no-load state;

each of the magnet sections is formed by at least two of permanent magnets;

each of the armature coils of the stator has a direct axis inductance being higher than a quadrature axis inductance; and the permanent magnets are so arranged that a length between adjacent two of the permanent magnets of the opposite polarities is greater than a length between adjacent two of the permanent magnets of the same polarity.

2. The rotary electric machine as claimed in claim 1, wherein each of the permanent magnets is arranged at a predetermined angle with respect to a direction perpendicular to the air gap.

3. The rotary electric machine as claimed in claim 2, wherein the rotor confronts the stator radially across the air gap.

4. The rotary electric machine as claimed in claim 1, wherein the rotor confronts the stator axially across the air gap.

* * * * *